2,980,608
METHOD OF FLOCCULATING SUSPENDED SOLIDS

Tegner A. Johnson, Duluth, Minn., assignor to United States Steel Corporation, a corporation of New Jersey
No Drawing. Filed Nov. 7, 1956, Ser. No. 620,794
1 Claim. (Cl. 210—52)

This invention relates to an improved method of flocculating solids suspended in water.

My flocculating method is especially applicable to slimes or tailings which remain suspended in water after an ore concentrating operation, particularly iron ore. Before such water can be re-used or even drained into streams or lakes, it is usually necessary to settle out at least the major portion of the suspended solids. Numerous flocculating agents are known for hastening such settling and reducing the capacity of equipment required, typical of which are various forms of starch or even hydrated lime.

An object of my invention is to provide an improved and more effective flocculating method for settling suspended solids compared with previous methods with which I am familiar.

A more specific object is to provide a flocculating method which utilizes an improved and more effective agent, namely a solution of silica substantially free of alkali metal ions, in combination with hydrated lime.

A silica solution for use in my invention can be prepared by treating a solution of alkali metal silicate (for example $Na_2SiO_3$) with a suitable cationic exchange medium. This medium can be any of the well known substances capable of exchanging hydrogen ions for alkali metal ions present in the silicate. Examples are natural and synthetic zeolite and certain synthetic resins which have hydrogen atoms in ion exchange positions, such as the phenolic resin sold by the trade name "Amberlite IR-100H." Either the solution can be passed through a bed of ion exchanger or else granules of the exchanger can be agitated with the solution. During such treatment the ion exchanger acquires alkali metal ions from the solution, but can be regenerated by treatment with an acid, as known in the art.

The foregoing treatment is carried out with a rather dilute solution of alkali metal silicate, that is, with a maximum concentration of about 3% $SiO_2$ by weight. To provide a more convenient form for handling the solution after the ion exchange reaction, it may be concentrated by evaporation up to about 30% $SiO_2$ by weight. The silica thereupon changes from a true solution to a colloidal suspension, and a small amount of alkali metal is required to stabilize the suspension and prevent formation of a viscous gel. The mol ratio of $SiO_2$/alkali metal oxide used for stabilizing purposes is at least 10 to 1 or preferably 25 to 1. Alkali metal can be introduced for this purpose most conveniently by operating the ion exchange reaction to allow a small amount of alkali metal ions to pass into the product at the end of each cycle. A concentrated colloidal silica suspension of this type is available commercially under the trade name "Ludox."

In practicing my invention, silica solution substantially free of alkali metal ions, or containing only a small amount of such ions for stabilizing purposes, is introduced to a water suspension of solids in an amount to furnish 0.25 to 10 pounds $SiO_2$ per long ton of solids in suspension. A saturated solution of hydrated lime also is introduced thereto in an amount to furnish 1 to 5 pounds $Ca(OH)_2$ per long ton of solids. The operation can be conducted in any suitable conventional settling apparatus, as known in the art, although the flocculating action of the agent accelerates settling to an extent that the capacity of the apparatus can be smaller than otherwise required. The suspended solids form relatively large flocs which readily settle by gravity, leaving a relatively clear supernatant liquid.

As a specific example to demonstrate the effectiveness of my method, I prepared a group of samples by mixing 56 grams of dried silicious iron ore tailings with water to form 750 ml. of slurry, added various flocculating agents hereinafter listed, added more water to make up the volume of slurry to 1000 ml., and again mixed the slurry. I made up these samples in a glass cylinder of 60 mm. inside diameter and a column height of 350 mm. After allowing a 10 minute settling time, I determined the content of solids remaining in suspension by siphoning off and filtering a 500 ml. portion of the supernatant liquid (equivalent to a column 170 mm. high). I then dried the residue at 110° C. and weighed the dried residue. In the following table the solids remaining in suspension with the different agents are reported in parts per million of suspended solids.

| Reagents Used, lbs./long ton | Suspended Solids, parts per million |
|---|---|
| Silica solution equivalent to 0.5 lbs. $SiO_2$ 2.0 lbs. $Ca(OH)_2$ | 19.2 |
| Sodium silicate solution equivalent to 0.5 lbs. $SiO_2$, 2.0 lbs. $Ca(OH)_2$ | 571.2 |
| 2.0 lbs. $Ca(OH)_2$ | 724.6 |
| 0.5 lbs. Caustic Starch | 816.4 |

From the foregoing table it is seen that my flocculating method is highly effective for settling suspended solids. In the samples tested, my flocculating agent proved about 38 times more effective than lime alone and 43 times more effective than caustic starch. The latter was prepared in the conventional way by making a starch paste, adding solid NaOH, heating the mixture to 70° C. and diluting with water to a concentration of 1% starch and 0.5% NaOH.

While I have described only certain preferred ways of practicing my invention, I do not wish to be limited by the disclosure set forth, but only by the scope of the appended claim.

I claim:

A method of treating a water suspension of iron ore slimes remaining after a concentrating operation to accelerate settling of the solids therein and produce a relatively clear supernatent liquid for re-use in the operation consisting of adding to the suspension a flocculating agent, which agent consists of a solution of silica having a mol ratio of $SiO_2$/alkali metal oxide of at least 10 to 1, in combination with hydrated lime, said silica solution being added in an amount to provide about 0.25 to 10 pounds $SiO_2$ per long ton of suspended solids, and said lime in an amount to provide about 1 to 5 pounds $Ca(OH)_2$ per long ton of suspended solids, and thus forming substantially all the suspended solids in relatively large flocs which readily settle by gravity.

References Cited in the file of this patent

UNITED STATES PATENTS

| | | |
|---|---|---|
| 2,152,942 | Wilson | Apr. 4, 1939 |
| 2,378,323 | Pomeroy | June 12, 1945 |
| 2,381,514 | Phelps | Aug. 7, 1945 |
| 2,444,774 | Hay | June 6, 1948 |
| 2,577,484 | Rule | Dec. 4, 1951 |
| 2,669,355 | Archibald | Feb. 16, 1954 |

FOREIGN PATENTS

| | | |
|---|---|---|
| 611,914 | Great Britain | Nov. 5, 1948 |